M. G. FOX.
WIND SHIELD.
APPLICATION FILED MAY 12, 1916.
1,223,780.
Patented Apr. 24, 1917.
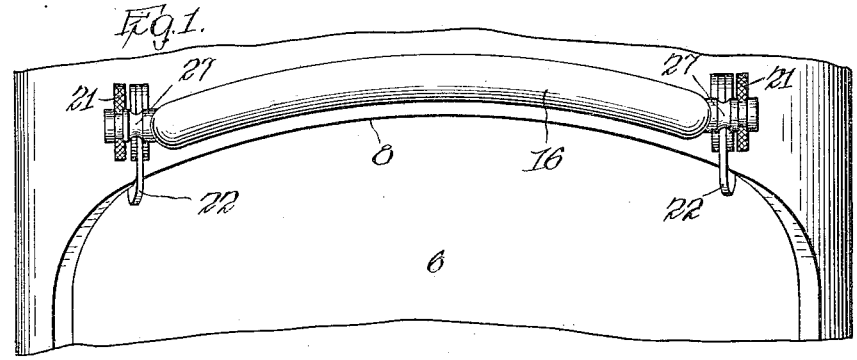
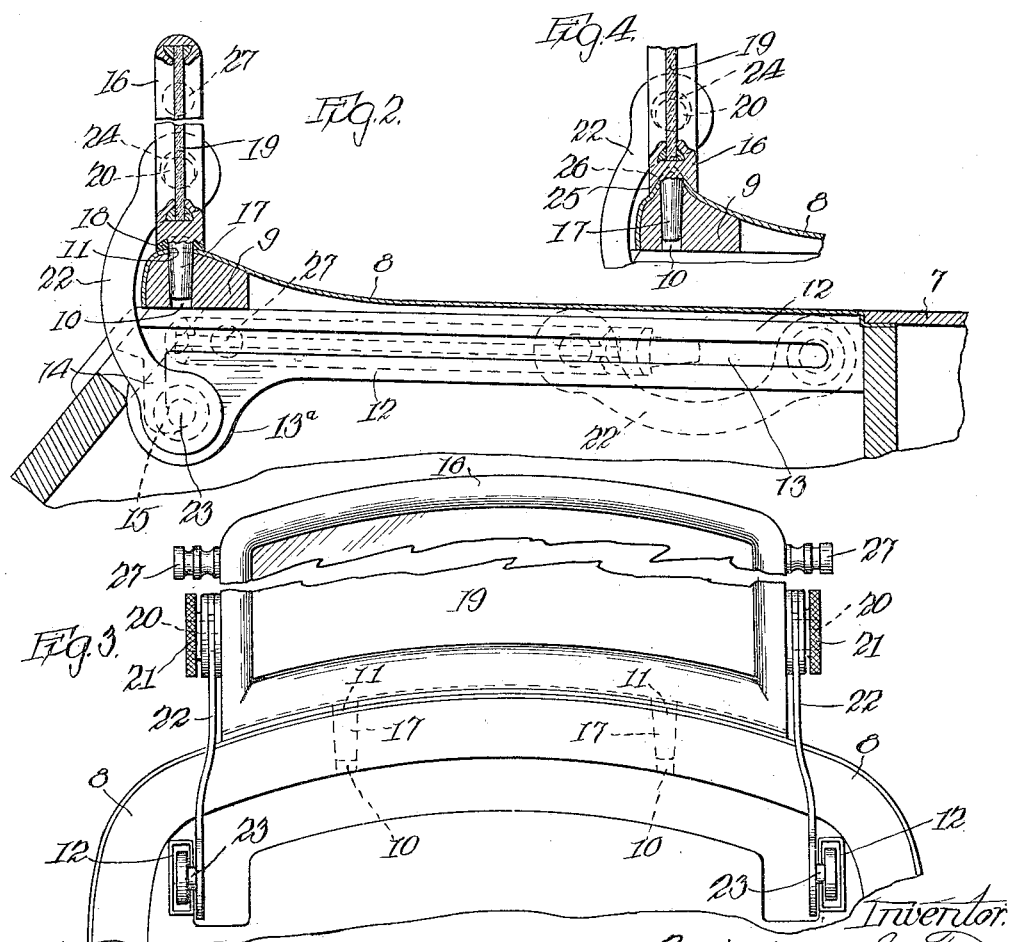
Inventor.
Michael G. Fox.
By Chas. C. Tillman
Atty.
Witness:
Leo J. D. Marais.

UNITED STATES PATENT OFFICE.

MICHAEL G. FOX, OF CHICAGO, ILLINOIS.

WIND-SHIELD.

1,223,780.  Specification of Letters Patent.  Patented Apr. 24, 1917.

Application filed May 12, 1916. Serial No. 97,030.

*To all whom it may concern:*

Be it known that I, MICHAEL G. FOX, a citizen of the United States, and resident of Chicago, in the county of Cook and State of Illinois, have invented certain new and useful Improvements in Wind-Shields, of which the following is a specification.

This invention relates to certain new and useful improvements in a wind-shield of an adjustable or disappearing type, for automobiles, or other conveyances or vehicles, which are adapted for rapid movement, and it consists in certain peculiarities of the construction, novel arrangement and operation of the various parts thereof as will be hereinafter more fully set forth and specifically claimed.

The principal object of the invention is to provide a wind-shield for the protection of the occupant or occupants of an automobile or other vehicle from wind, rain, cold or other inclement weather conditions, which shall be simple and inexpensive in construction, strong, durable and efficient in operation, with its parts so made, arranged and operating, that the shield can be readily placed and firmly secured in its operative position, or if desired, easily and quickly placed in a concealed position where it will be out of the way and protected against damage and its transparent plate from becoming soiled. Another object of the invention is to provide a wind shield of the above mentioned general character, which shall be of such construction as to make it possible in constructing a vehicle to carry out the attractive or harmonious curved lines so essential to the beauty of an automobile or vehicle.

Other objects and advantages of the invention will be disclosed in the subjoined description and explanation.

In the accompanying drawing which serves to illustrate an embodiment of the invention—

Figure 1 is a plan view of a fragment of the cowl and a portion of the floor of the body of an automobile, showing my improved wind shield mounted on the former and in its operative position.

Fig. 2 is a vertical sectional view taken transversely through the frame of the shield, and longitudinally through the cowl, and a part of the hood of the machine and illustrating one of the tracks or guide ways for the wind-shield and its parts. In this view the shield is shortened for the convenience of illustration.

Fig. 3 is a rear face view in elevation showing the shield shortened and narrowed for the convenience of illustration and in its operative position.

Fig. 4 is a fragmental sectional view of the shield and rear portion of the cowl, showing a modification in the construction of the parts.

Like numerals of reference refer to corresponding parts throughout the different views of the drawing.

The reference numeral 6 designates the floor of the body of the automobile or vehicle, which body may be provided at its front portion with a hood 7 of the ordinary or any well known construction. From the rear portion of the hood 7 is a rearwardly extended cowl 8, which by preference, is curved as shown, and is provided at its rear or upper portion with a reinforcing or finishing strip or piece 9 of any suitable size and material, which strip is located transversely with respect to the cowl 8 and is provided with a plurality of sockets 10, which sockets register with suitable openings 11 in the top of the cowl 8, as will be readily understood by reference to Figs. 2 and 3 of the drawing. Located longitudinally on the cowl and near each side thereof, is a channeled member 12, each of which has formed in its inner portion a longitudinal track or guide-way 13 for the reception and operation of certain parts of the shield, as will be presently explained. The members 12 are located in parallelism with one another, as will be understood by reference to Fig. 3 of the drawing, and may be secured to the cowl metal by being welded thereto or supported under the cowl in any other suitable way. As shown in Fig. 2, each of the members 12 is provided at its rear end with an enlargement 13ª, which enlargement is also hollow or channeled and is provided with a slot 14, or guide-way, which communicates at its upper end with the rear end of the guideway 13 and terminates at its other end in a forwardly and slightly upwardly extended portion 15, see Fig. 2 of the drawing.

The frame of the shield is indicated by the reference numeral 16 and may be made of any suitable size, form and material, but by preference substantially rectangular in shape and slightly forwardly curved as shown in the drawing. This frame has on its lower portion a plurality of pins 17 to fit in the grooves 10 and to assist in holding the frame 16 in its upright position. The bottom of the lower portion of the frame 16 is by preference provided with a strip of flexible material 18 such as rubber or leather, which is used for the purpose of cushioning the frame as well as for packing therefor, to prevent the passage of rain, snow or wind between the lower part of the frame 16 and the top of the cowl. Fitted in the frame 16 is a sheet of transparent material 19, which may be glass or any other suitable transparent or semi-transparent material, and said sheet is by preference forwardly curved to conform to the curve of the frame 16 as well as to the transverse curve of the cowl 8, to the end that when the shield is placed in its inoperative or concealed position, as shown by dotted lines in Fig. 2 of the drawings, the parts will be compactly located. Another advantage attained in forming the transparent material 17 with convexed or rounded front surface, is that such a form causes much less wind resistance while in use. Each side of the frame 16 is provided near its lower portion with a laterally extended screw-threaded stud 20 on the outer portion of which is threaded a knurled nut 21 which is used for clamping and securing on said stud one end of a link 22, the other end of which link is located in the enlarged portion 13ª of each of the members 12 as will be readily understood by reference to Figs. 2 and 3 of the drawing, that is to say, it is so located when the shield is in its operative position. By reference to Figs. 1 and 2 it will be seen that the links 22 are rearwardly curved so as to extend over the rear portion of the cowl 8 and into the enlarged parts 13ª of the members 12 or guide-ways. Each of the links 22 has on the outer surface of its lower portion a headed projection 23, which projection is adapted to operate in the slot 13 or guideway 13, 14 and 15 of the member 12. Each of the links 22 is provided in its upper portion with an opening 24 for the reception of the stud or pin 20, and it will be observed by reference to Fig. 2 that said opening is considerably larger than the pin or stud 20, so as to permit of some movement of the links 22 when the ends 21 are loosened for this purpose.

In Fig. 4 of the drawing I have shown a modification in the construction of the rear portion of the cowl and the lower part of the frame 16 of the shield which consists in forming or providing the cowl with a transversely extended rib 25 on its rear upper portion to fit into a groove 26 in the lower portion of the frame 16, by which arrangement it will be understood that water, snow or wind will be prevented passing between the lower part of the shield and the upper surface of the cowl. In this modified form the other elements above described are employed.

The operation of the device is simple and as follows: Assuming that the shield is in its operative position as shown by continuous lines in the different views of the drawing, and it is desired to lower and conceal the shield, the nuts 21 may be loosened on the stud or pins 20, when it is apparent that the frame 16 may be slightly elevated and the projections 23 withdrawn from the portions 15 of the slots 14, when it is obvious that the pins 17 may be freed from their sockets and the frame 16 tilted rearwardly, in which operation the projections 23 will enter the rear ends of the guide-ways 13, when by pressing the frame forwardly, it will be guided by said ways to about the position shown by dotted lines in Fig. 2, where it will be supported and protected until again needed as a protector or shield. The frame 16 is provided at each of its sides near the upper portion thereof with a lateral projection 27, which will also operate in the guide-ways 13 and assist in supporting the frame of the shield.

Having thus fully described my invention, what I claim as new and desire to secure by Letters Patent is—

1. In a wind shield for vehicles, the combination with the vehicle-body, of a housing located above the floor of said body, and having sockets in its upper rear portion, a member located longitudinally with respect to said housing and within the same near each side thereof, each of said members having a hollow enlargement at its rear portion and provided with a longitudinal guide-way on its inner surface, each of said enlargements having a vertical guide-way terminating at its lower end in a forward extension, a frame having a transparent sheet and transversely mounted on the rear portion of the housing, pins on the lower part of said frame, a link adjustably mounted at its upper end on each side of said frame and a projection on the lower portion of each of said links to operate in the guide-ways of said members.

2. In a wind shield for vehicles, the combination with the vehicle body, of a housing located above the floor of said body and having on its rear upper portion a transversely disposed rib provided with a plurality of sockets, a member located longitudinally with respect to said housing and within the same near each side thereof, each of said members having a hollow enlargement at its rear portion and provided with a longitudinal guide-way on its inner surface, each of said enlargements having a vertical guide-way terminating at its lower end in a forward extension, a frame having a transparent sheet and transversely mounted on the rear portion of the housing, the said frame having in its lower surface a groove to receive said rib, pins on the lower part of said frame to fit in said sockets, a link adjustably mounted at its upper end on each side of said frame and a projection on the lower portion of each of said links to operate in the guide-ways, of said members.

MICHAEL G. FOX.

Witnesses:
CHAS. C. TILLMAN,
A. E. OLSON.

Copies of this patent may be obtained for five cents each, by addressing the "Commissioner of Patents, Washington, D. C."